A. GIRARD.
PICKER STRAP.
APPLICATION FILED MAY 25, 1910.
990,975.
Patented May 2, 1911.
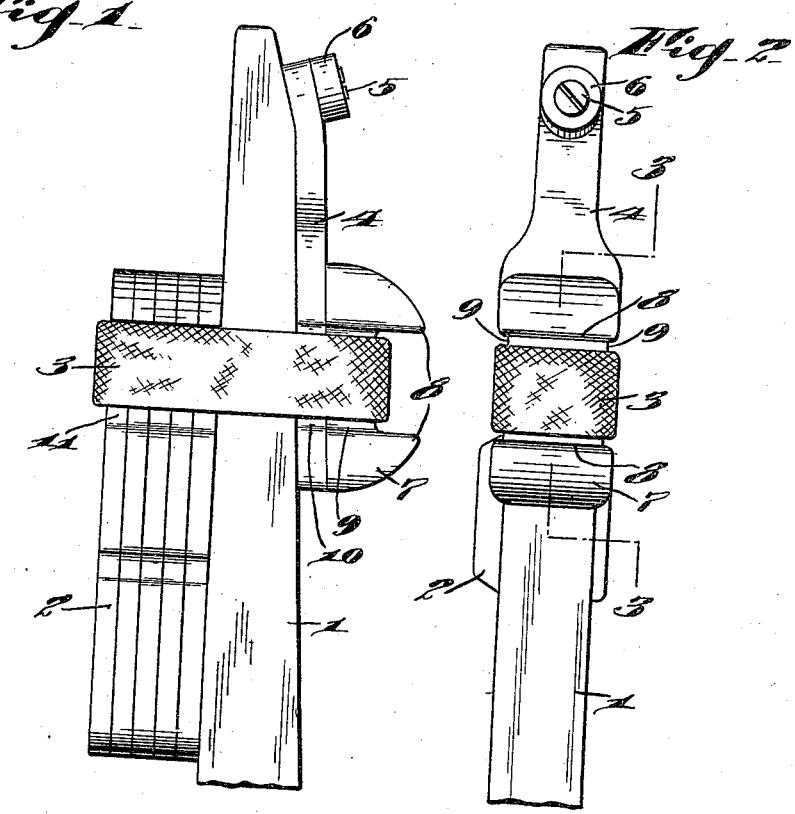
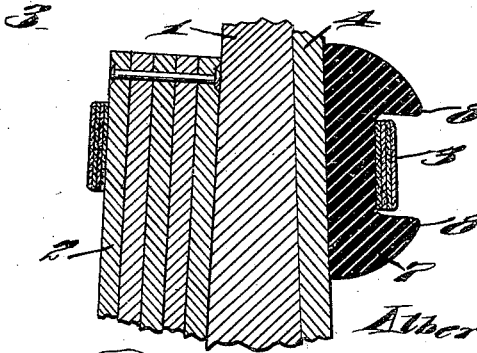
Witnesses
Thos. Rosemann
R. N. Krenkel
Inventor
Albert Girard,
By Joshua R. H. Potts.
Attorney

UNITED STATES PATENT OFFICE.

ALBERT GIRARD, OF CHESTER, PENNSYLVANIA.

PICKER-STRAP.

990,975.  Specification of Letters Patent.  Patented May 2, 1911.

Application filed May 25, 1910. Serial No. 563,391.

*To all whom it may concern:*

Be it known that I, ALBERT GIRARD, a citizen of the United States, residing at Chester, in the county of Delaware and State of Pennsylvania, have invented certain new and useful Improvements in Picker-Straps, of which the following is a specification.

My invention relates to improvements in picker straps, the object of the invention being to provide an improved mechanism for holding the picker in position on the picker stick, which will compensate for any stretching of the picker strap and insure a tight joint at all times.

Heretofore, picker straps which when first applied tightly hold the picker against the stick, but in the course of time, the strap stretches more or less, which renders its usefulness at an end, and it is quite an item of expense to replace these straps.

My invention is designed to overcome this objection and will now be described in detail.

With these and other objects in view, the invention consists in certain novel features of construction and combinations and arrangements of parts, as will be more fully hereinafter described and pointed out in the claim.

In the accompanying drawings: Figure 1, is a view in side elevation illustrating my improvements. Fig. 2, is a view at right angles to Fig. 1, and Fig. 3, is a view in section on the line 3—3 of Fig. 2.

1, represents the upper end of a picker stick, 2 the picker, and 3 the picker strap. The picker is ordinarily made of a plurality of thicknesses of leather, and the picker strap 3 of canvas or duck treated in a particular manner to make it strong and rigid. To the rear face of the picker stick I secure a leather strip 4 by means of a screw 5, which passes through a washer 6 at the upper end of the strip 4, and is screwed into the picker stick.

7, represents my improved block of rubber or other elastic material which is interposed between the strap 3 and strip 4, and is provided with outwardly projecting lugs 8, and is recessed at its sides as shown at 9, which register with recesses 10 in the sides of strip 4, so that the strap 3 is confined in these recesses as well as in the recess 11 ordinarily formed in the picker. By means of a construction of this character, the elastic block 7 exerts a continual pull or pressure on the strap 3, and should the latter stretch, the expansion of block 7 will compensate for such stretching, and the strap will last for an indefinite period.

Various slight changes might be made in the general form and arrangement of parts described without departing from my invention, and hence I do not limit myself to the precise details set forth, but consider myself at liberty to make such changes and alterations as fairly fall within the spirit and scope of the appended claim.

Having thus described my invention, what I claim as new and desire to secure by Letters Patent is:

In combination with a picker stick, a picker, and a picker strap around the picker and the stick, a block of elastic material inside the strap, and a leather strip interposed between the block and the stick and secured to the stick, said elastic block having outwardly projecting lugs, said block, said strip, and said picker having recesses in their sides to receive the strap, and a screw securing said strip to said stick, substantially as described.

In testimony whereof I have signed my name to this specification in the presence of two subscribing witnesses.

ALBERT GIRARD.

Witnesses:
EDWARD F. CARR,
JOHN E. McDONOUGH.

Copies of this patent may be obtained for five cents each, by addressing the "Commissioner of Patents, Washington, D. C."